March 30, 1937.　　　J. A. V. TURCK　　　2,075,375
CALCULATING MACHINE
Original Filed May 16, 1930　　5 Sheets-Sheet 1

Inventor:
Joseph A. V. Turck
Charles B. Rasmussen
Atty.

March 30, 1937.  J. A. V. TURCK  2,075,375
CALCULATING MACHINE
Original Filed May 16, 1930   5 Sheets-Sheet 2

Inventor:
Joseph A. V. Turck
Charles B. Rasmussen
Atty.

March 30, 1937. J. A. V. TURCK 2,075,375
CALCULATING MACHINE
Original Filed May 16, 1930  5 Sheets-Sheet 3
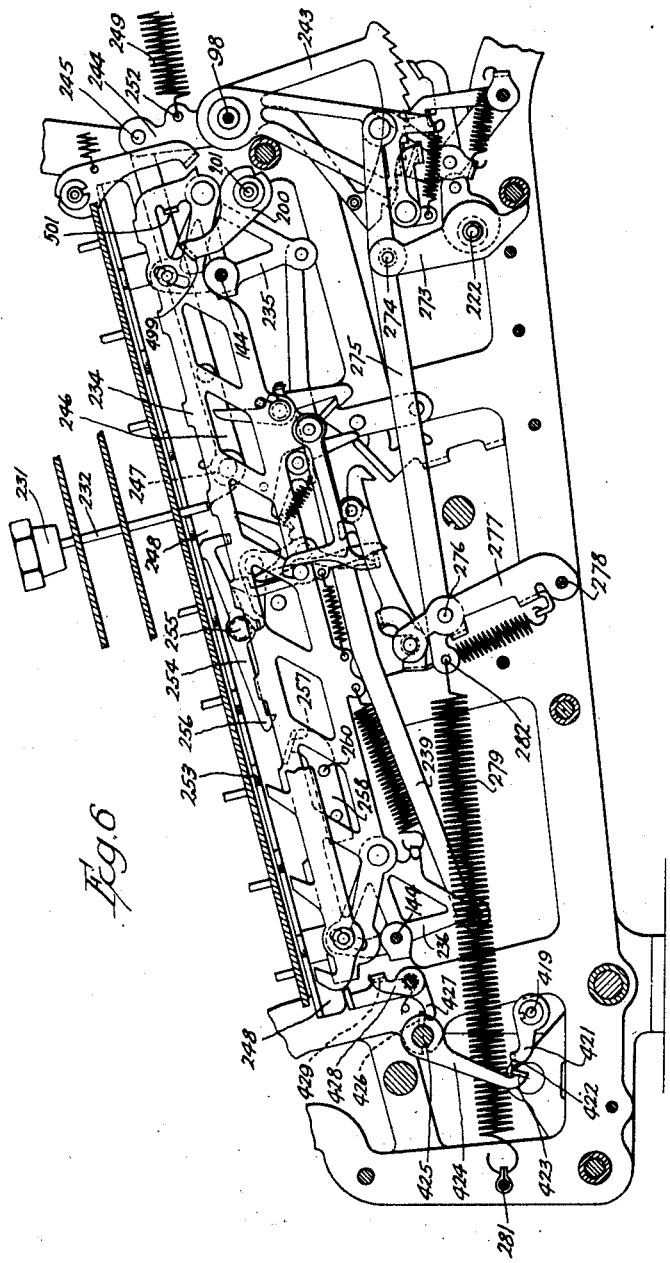

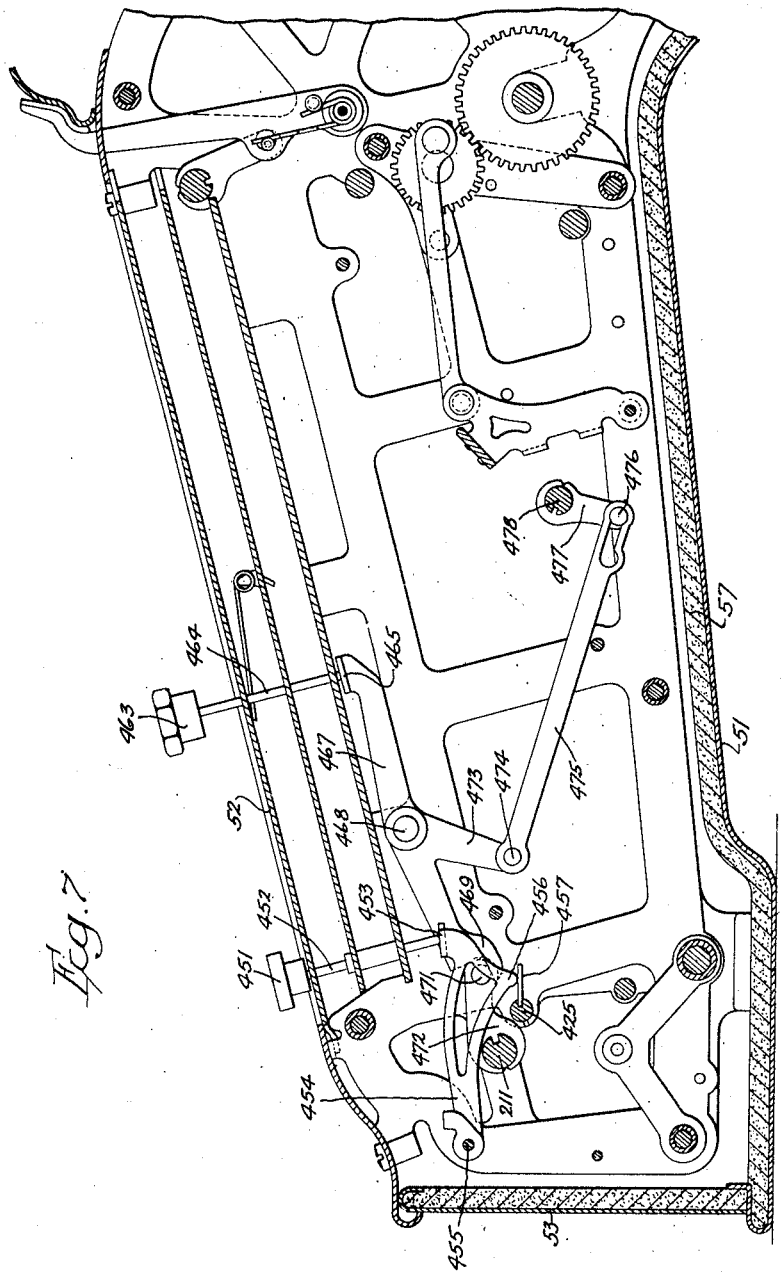

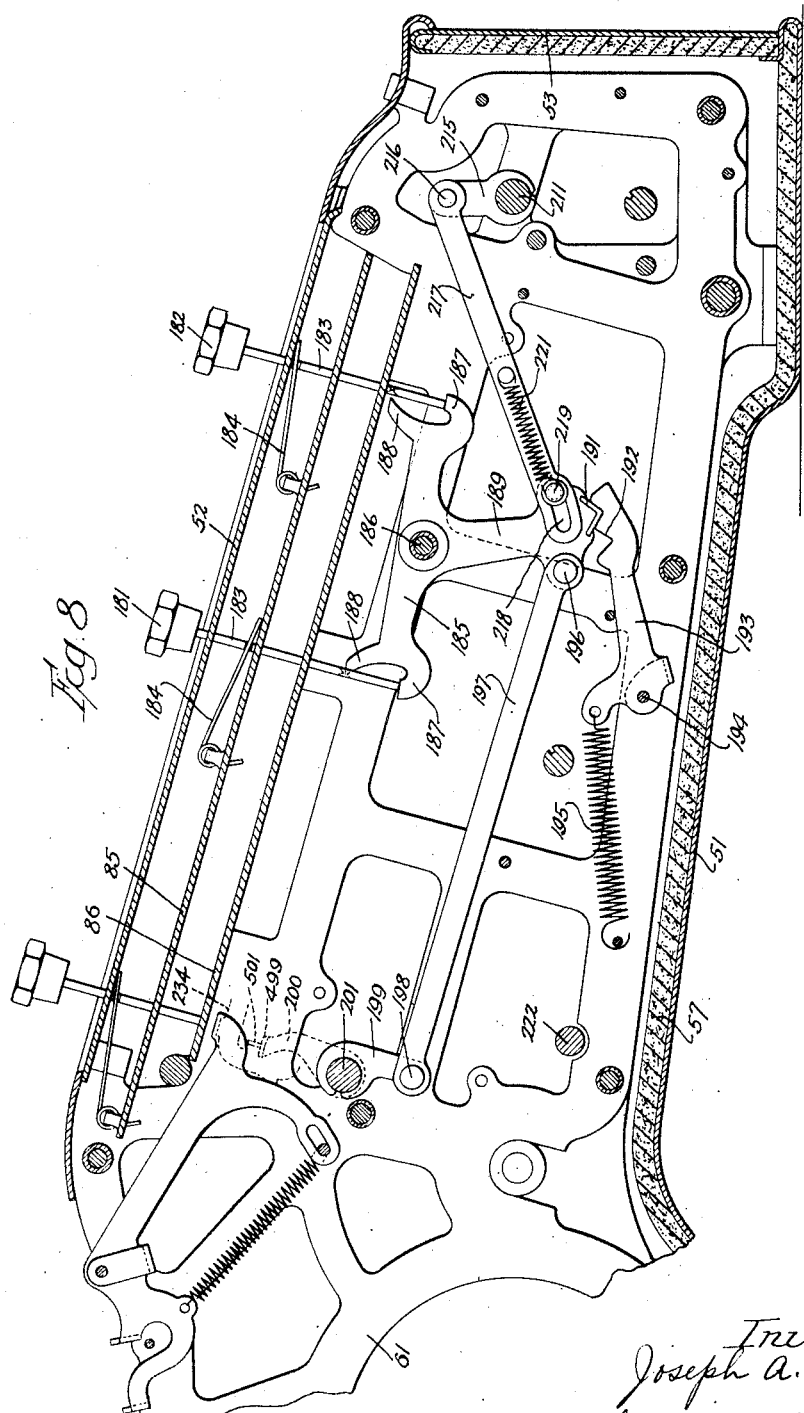

Patented Mar. 30, 1937

2,075,375

UNITED STATES PATENT OFFICE 2,075,375

CALCULATING MACHINE

Joseph A. V. Turck, Wilmette, Ill., assignor to Felt & Tarrant Mfg. Co., Chicago, Ill., a corporation of Illinois Original application May 16, 1930, Serial No. 452,876. Divided and this application March 26, 1934, Serial No. 717,346

12 Claims. (Cl. 235—130)

This invention relates in general to improvements in calculating machines and, while it has more particular reference to improvements in calculating machines wherein additive actuating mechanisms are optionally arrangeable for key responsive operation and/or key set operation, it will be apparent that certain features of the invention have other and more general valuable application. This application is a division of my co-pending application Serial No. 452,876.

A principal object of the present invention is the provision (in a power operated calculating machine wherein the banks of ordinally arranged digital keys may be optionally operated as a key responsive calculating machine for addition and subtraction and as a key set machine for multiplication and division) of an error control mechanism operative with both the key responsive and key set mechanisms and acting to lock the automatic digital control devices in the event that error is made in setting up the multiplicand or divisor on the keyboard.

Another important object of the invention is the provision of a locking mechanism for preventing manipulation of the multiplier keys when the ordinal actuating mechanisms are arranged for key responsive action.

Another important object of the invention is the provision of means which will prevent miscalculation resulting from an incomplete key stroke of any of the keys.

Another important object of the invention is the provision of locking mechanism and devices which will insure against error through mismanipulation of any of the keys of the keyboard, occurring by reason of insufficiently depressing a key or undertaking redepression before completion of the previous stroke.

Numerous other objects and advantages of the invention will be apparent as it is better understood from the following description which, when taken in connection with the accompanying drawings, discloses a preferred embodiment thereof.

On the drawings,

Fig. 6 is a front to back vertical sectional view taken through the machine and alongside the multiple control mechanism, parts being broken away;

Fig. 7 is a vertical front to back sectional view illustrating means by which power is transmitted from the drive to the multiple control mechanism and likewise the universal keyboard clearing device provided for use in key set operation;

Fig. 8 is a vertical front to back section taken adjacent the lefthand side of the machine and showing a mechanism for arranging the parts optionally for key responsive and key set operation.

Figure 1:
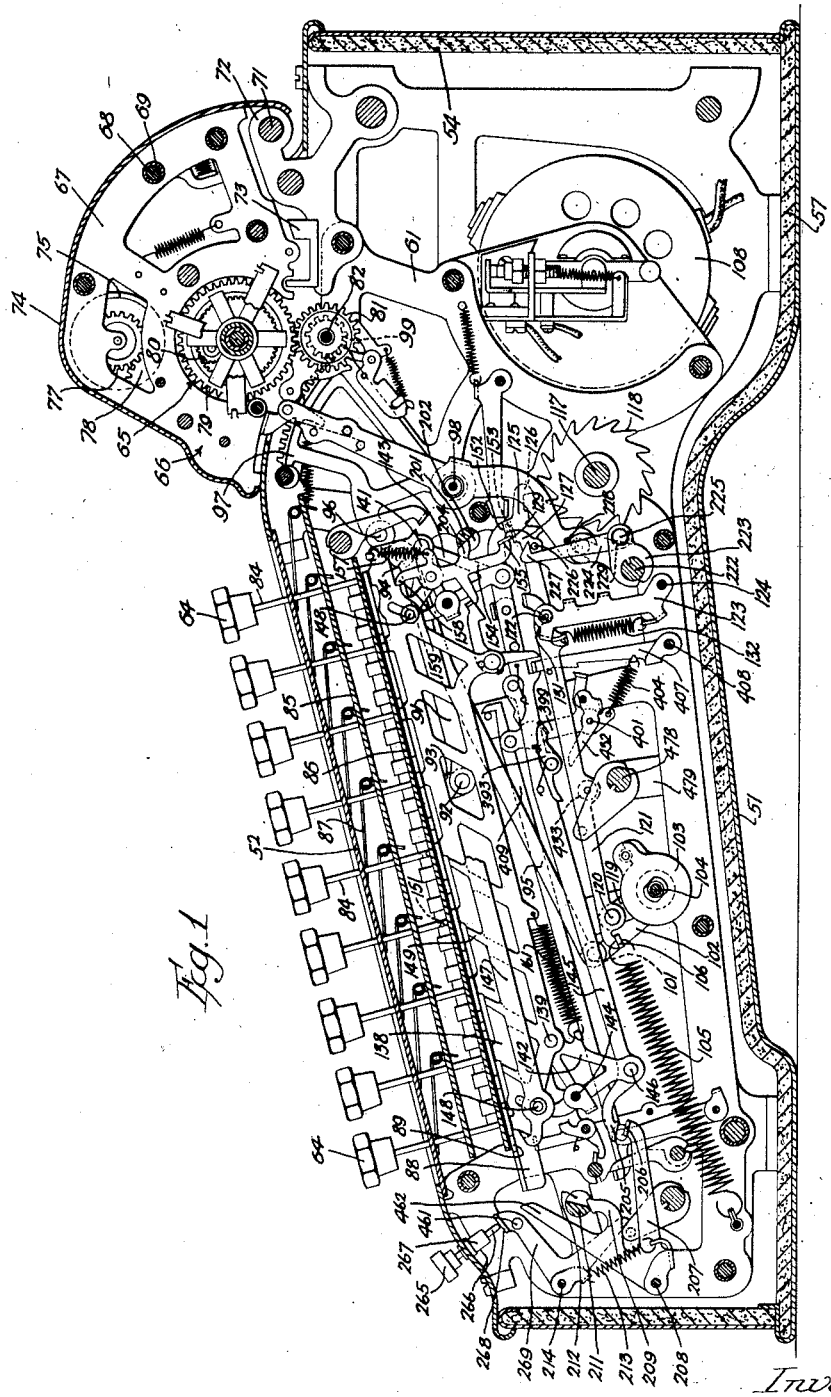
Figure 1 is a front to back vertical section taken at the right of the righthand digital order of the machine.

The calculating machine shown on the drawings and constituting the embodiment of the invention at present preferred, comprises a casing formed of a base plate 51, a top plate 52, a front wall 53, a rear wall 54, and suitable side walls (not shown). The bottom and vertical walls may, if desired, be provided with sound deadening and cushioning packing 57. The machine shown on the drawings is of ordinal character and a plurality of accumulator actuating mechanisms for accumulator actuating units is provided, and the several actuating mechanisms of the adding orders of the machine are arranged between partition plates 61. Each adding order of the machine is provided with a series of digital control keys 64, each such series comprising nine keys bearing the numbers 1 to 9 to be used in addition and multiplication and their complements to be used in subtraction and division.

A plurality of accumulator units, generally indicated by reference character 65, are mounted in a shiftable carriage 66, which, as will be presently more fully explained, is shiftable transversely of the actuating units and into progressive co-operative relation therewith to cause predetermined additive actuations to be received by and stored in predetermined desired accumulator units. The carriage comprises generally a frame consisting of partition plates 67 secured in spaced relation by tie rods 68 and bushings 69. The carriage is pivoted upon a cross-rod 71 mounted in upward extensions 72 of the side supporting plates and rests upon a trackway 73, in turn supported upon and fixed to said supporting plates. The carriage is provided with a carriage housing 74 enclosing its rear, top, front and ends, leaving the bottom open for co-operative engagement between the accumulator units and the additive actuating mechanisms.

Each accumulator unit comprises a numeral wheel 75 adapted to be viewed through suitable sight openings in the casing housing 74 and carrying a pinion 77 in mesh with a pinion 78 which in turn co-operates through a cyclic gear 80 with a gear 79 which forms a transmitting gear mechanism for advancing the numeral wheels by the desired adding movements and in accordance with the degree of actuation of the ordinal column actuators as received by a ratchet gear mechanism 81 fixed upon a cross-rod or shaft 82 carried in the main frame of the machine.

In the movement of the carriage and its contained accumulator units across the machine, the gears 79 are disengaged from the ratchet gear mechanism 81 at the beginning of a shifting movement and reentrained in co-operative relation with other ratchet gear mechanisms as may be desired in the calculation.

Each key 64 is provided with a downwardly extending stem 84 arranged through the keyboard plate 52 and through sub-plates 85 and 86. Springs 87 are provided to hold the keys in elevated position and to return them after each key stroke. Each order of the machine includes a digital control stop bar 88 arranged to extend beneath the lower end of the key stems when the keys are in elevated position and to be pulled rearwardly of the machine in amount determined by the additive value of the particular key of the order depressed. The stop bar 88 is provided with differentially spaced lugs 89 adapted to engage the depressed key stem of the order, the spacing being such that the stop bar 88 has an increasing unit movement from the 1-key at the front to the 9-key at the rear of the associated order of the keys.

A link 91 is connected at 92 with a downwardly extending arm or lug 93 on the stop bar 88 and at 94 to a link 95 in turn connected at 96 to a rack sector 97 pivoted upon a cross-rod 98 and provided with teeth continuously in engagement with a pinion 99 forming a part of the ratchet gear mechanism 81. The link 95 is pivotally connected at its other or front end 101 with an arm 102 of a friction device 103 carried upon a shaft or rod 104 extending across the machine and having bearing in the partition plates 61. A spring 105 is connected at 106 with a link 121 to be later described.

Upon an adding movement, depression of the sector is accomplished by continuously moving power mechanism to which it is connected by depression of a key, the result of this connection to the power being that the associated rack sector 97 is swung down the desired amount with a consequent extension of the spring 105 and the storing in it of power to accomplish the adding movement upon disconnection of the actuating unit affected from the power means. This power means comprises an electric motor 108.

It is not believed that a detailed description of the motor 108 and the wiring for its supply of current is necessary to an understanding of the instant invention. The motor rotates continuously when the machine is in use.

A power shaft 117 extending across the several columns or orders of the adding machine is provided with a toothed wheel 118 for each order of the adding machine, these toothed wheels 118 being arranged adjacent the several actuating units or mechanisms.

Referring to Fig. 1, it will be noted that the friction device 103 of each actuating mechanism is provided with an arm 119 pivotally connected at 120 with a link 121 in turn pivoted at 122 in an upright guard arm 123 pivotally mounted upon a cross-pin or rod 124 extending across the frame. An arm 125 having a tooth or hook 126 at its rear end and a spring lifted lever 127 are also pivoted to the upper end of the guard arm 123 on pivot 122.

In accomplishing a calculating operation, depression of a key causes the hook arm 125 to engage the toothed wheel 118 and to be moved a full stroke of the machine.

The power strokes are all of a predetermined travel which is the same for all digital values. A sector or rack segment 97 is moved downwardly in the power stroke, only the amount permitted by the particular digital key depressed, downward movement of the sector continuing until halted by engagement of the stop bar 88 with the key stem of the key depressed. The friction device 103 permits continuation of the movement of the link 121 after the halting of its associated sector 97. The power stroke extends the spring 105 and stores up in it the power needed to accomplish the adding actuation of the accumulator. Upon disconnection of the hook 126 from the toothed wheel, the spring 105 moves the parts back to normal position, the latter part of this movement being accompanied by an upward movement of the rack sector 97, and, through toothed wheel mechanism 81, by the desired advancement of the numeral wheel of the associated accumulator unit. The earlier part of the return movement under the impulse of spring 105 is taken up in the friction device 103.

The control of the hook 125 prevents its engagement with the toothed wheel 118 until a particular key depressed is locked down into depressed position where it must remain until released. A parallel motion device is provided for each actuating unit and includes an equalizing key bar 138 pivoted at 139 and 141 respectively to levers 142 and 143, which in turn are pivoted at 144 on rods extending through the partition plates of the frame. The parallel motion device also includes a bottom bar or link 145 pivoted at 146 to the lower ends of the levers 142 and 143. A key locking bar 147 (Fig. 1) is pivoted at each end at 148 to the upper ends of the levers 142 and 143 and is provided with locking fingers 149 adapted to enter into conically faced openings 151 of the stem as they are depressed. Depression of this bar by a key stem in its parallel motion swings the levers 142 and 143 in a clockwise direction and causes the adjacently arranged locking finger 149 to enter into the presented opening 151 of the stem 84 of the key depressed.

The springs 131 and 132 normally hold the hook arm 125 in an elevated position and clear of its toothed wheel. The hook arm 125 is normally arranged in elevated position and has a laterally extending shoulder or lip 152 which is normally disposed a short distance above an appropriately arranged lip 153 provided on the rear end of the link 145 and is adapted to engage the upper side of lip 153 upon depression of hook arm 125.

The key bar 138 carries a downwardly extending dog 154 which is provided at its lower end with a lug 155 arranged above and in position to engage the lug 129 upon the spring lever 127, this dog being normally held in a rearward position by a spring 157 tending to swing the dog in a counterclockwise direction and maintaining a shoulder 158 extending up from the dog in engagement with a shoulder 159 on the bar 138.

Upon depression of a key, the dog 154 depresses the spring lever or arm 127, the hook arm 125 being held up at this instant by the interengagement of its lip 152 on top of the lip 153 at the rear end of link 145. The depression of the key moves down its equalizing bar 138 and moves also the link 145 toward the front of the machine, this motion being accomplished through the swinging of the levers 142 and 143.

As has been earlier stated, the machine shown on the drawings and disclosing the preferred embodiment of the invention is adapted for operation either as a power-driven key responsive calculating machine or as a power-driven key set machine for automatic actuation.

Referring to Fig. 8, it will be noted that at the left of the series of ordinal banks or rows of adding keys are two keys indicated respectively by reference characters 181 and 182, the former being labeled "key act" and the latter "auto act". These keys are adapted for alternate depression, the depression of one key raising the other. When it is desired to use the adding machine for key responsive operation, the key 181 is or must be arranged in depressed position and when it is desired to use the calculating machine for key set automatic repeated actuations, as in multiplication and negatively as in division, the key 182 is or must be depressed. These two keys have key stems 183 extending down through the keyboard plate 52 and the sub-plates 85 and 86, and springs 184 are provided to lift the keys when occasion permits.

A walking beam lever 185 is pivoted upon a cross-rod 186 just below the keys and this lever has an end 187 located beneath each key. It has also at each end a lock arm or finger 188 adapted to enter into an aperture in the key stem when the key is depressed and the engaged end of the lever swung downwardly to lock the parts in the assumed position.

The walking beam also has a downwardly extending arm 189 provided with a V-shaped lug or bottom 191 which may engage in either of two slots 192 in a spring lock lever 193 pivoted upon a cross-rod 194 carried by the frame. A spring 195 normally tends to lift the lever 193 and maintain engagement with the V-bottom of the walking beam lever 185. The arm 189 of this lever is connected at 196 with a link 197 extending toward the back of the machine and this link is in turn connected at 198 with an arm 199 fixed upon a cross-shaft 201 having suitable bearings in the frame and extending past the various orders of actuating mechanisms. This shaft is arranged closely adjacent the dogs 154, which it will be remembered serve to depress the spring lifted levers 127 and through them the hook members 125 into engagement with the power toothed wheel 118.

The shaft 201 is milled to its center at 202 adjacent each dog 154. An arm or finger 204 is provided on the dog to extend into the milled portion of the shaft when the parts are arranged for key responsive action. When, however, the key 182 is pressed, the shaft 201 is rocked in a counterclockwise direction (viewing Fig. 1) and all of the dogs of the several orders are swung toward the front of the machine moving their lugs or projections 155 out of registration with the lugs 129 of spring lifted levers 127. Depression of the keys with the parts thus arranged does not cause engagement of any of the hooks with their companion toothed power wheels. When the machine is thus arranged, advancement of the accumulator mechanism in desired amounts is otherwise accomplished as will be presently explained.

Means are provided for holding the keys and the parallel motion mechanism in the positions they assume upon key depression. Referring now to the lefthand end of Fig. 1, it will be noted that the forward ends of the links 145 are formed into lugs 205 arranged adjacent companion lugs 206 on latch arms 207 pivoted upon a cross-rod 208 in the frame. Each latch 207 is provided with an arm 209 having its end arranged adjacent a shaft 211 also extending across the machine and through suitable bearings. This shaft is milled to its center at 212 adjacent each latch arm 209 and when swung in a clockwise direction a spring 213 fast to the latch arms and to a rod 214 extending across the frame will pull the latch arms up into position to be engaged with the latch extension or lug 205 of the link 145 when a key is depressed to move the parallel motion device of its order. When the latch arms are rendered operative the lugs 206 of the latch arm raise up into contact with the latch extensions 205 of its companion parallel motion device and upon rearward movement of the link 145 becomes locked in hooked engagement with the latch arm.

Referring now to Fig. 8, it will be noted that the shaft 211 carries a fixed arm 215 arranged in front to back general registration with walking beam lever 185. The arm 215 is pivotally connected at 216 with a link 217 which extends to the arm 189 of the walking beam lever and is slotted at 218 to receive a pin 219 fixed to the arm 189. A spring 221 normally holds the pin 219 in the forward end of the slot 218.

It will be noted that the forward movement of the dogs 154 out of operative position with the spring lifted levers 127 results in no depression of these levers when a key is pushed down and the mechanism locked in the key set position just described. The spring lifted lever 127 and the hook arm 125 of the order involved are held up by the companion spring 132 until actuated by supplemental mechanism, which will be presently described, this mechanism being adapted to produce repeated actuations to accomplish multiplication and without the release or resetting of the particular key of the actuating mechanism depressed.

A shaft 222, having bearing in the frame, is arranged to extend across the several orders of additive actuating mechanisms and is provided with an arm 223 fixed to it and arranged adjacent each such order. A latch 224 is pivoted on each arm 222 at 225 and extends up to above a pin 226 fixed on the companion spring lifted lever 127. Each latch 224 is provided with a hook 227 at its upper end, adapted to engage over the pin 226 and depress the spring lifted lever 127 each time the shaft 222 is rocked in a clockwise direction. A stud 228 is arranged to extend out to the left from the adjacent partition plate of the frame and forms a stop limiting rearward movement of the latch 224. A spring 229 is provided at the pivot 225 to urge the latch 224 toward this stop stud.

It is intended that the shaft 222 will be oscillated the number of times determined by the digital value of the multiplier, and that like repeated depressions of the spring lifted levers 127 will be accomplished. Additive accumulation will be produced in the accumulator in accordance with the digital values of the keys depressed and locked in key set position. Each engagement of the hooks of the orders with their toothed power wheels will carry the pins 226 out of engagement with the latches 224. However, upon completion of the operative power stroke, the parts return to the position shown in Fig. 1 with the latches 224 again in position to depress the spring levers 127.

Referring to Fig. 6, a column or bank of keys 231 is arranged at the righthand side of the keyboard and one space removed from the ordinal columns of keys 64, and like them also are provided with stems 232 adapted to actuate a parallel motion device comprised of an equalizing key bar 234, two levers 235 and 236, pivoted respectively upon cross-rods 144, and a lower bar 239 pivoted at its ends to the levers 235 and 236. The keys 231 are multiplier keys and depression of any one of them results in the connection of the hook arm 125 with the toothed power wheel for the number of repeated additive operations indicated by the key depressed, i. e. one addition of the set-up multiplicand if the front key, namely the 1-key, be depressed; two additions if the second key from the front key be depressed, etc.

A ratchet segment 243 is pivotally mounted to rotate about the cross-rod or shaft 98 upon which are mounted the rack sectors 97, already described, and this ratchet segment 243 is disposed in position to control the number of reciprocations imparted to the latch 224 in number corresponding to the digital value of the particular key 231 depressed by the operator. In the instant embodiment of the invention the rack sectors 97 extend up to and to the rear from the pivotal supporting rod 98, and the ratchet segment 243 extends downwardly from the rod 98 and into cooperative relation with certain parts and devices to be presently described.

An arm 244 extends up above the ratchet segment 243 and is pivotally connected at 245 with a link 246 in turn connected at 247 with a differentially movable slide bar 248 constructed, mounted and controlled like the bars 88 of the additive actuating units earlier described. Depression of a key 231 results in a movement of the ratchet segment 243 in an idle clockwise stroke in amount determined by the value of the particular key depressed.

A spring 249 is suitably connected at one end to the righthand partition plate of the frame and at 252 to the upwardly extended arm 244 forming a part of the ratchet segment member. This spring at all times tends to move the ratchet segment in a clockwise direction and upon depression of the key the ratchet segment moves down and toward the front of the machine until halted by engagement of the adjacent differentially arranged projection 253 upon the slide bar 248 with the stem of the key depressed. Means are provided for returning the ratchet segment toward its normal position as described in my co-pending application Serial No. 452,876.

The spring 249 is under tension, as has been explained, and is restrained in its pulling movement upon the ratchet segment 243 and the bar 248 by a latch 254 pivoted at 255 on the bar 248 and having a hooked forward end 256 normally engaging over a stop lug 257 upon a cleat or member 258 fixed to the adjacent partition plate of the frame at 260. The construction and arrangement of the parts are such that upon depression of a key 231 the latch 254 will be disengaged from its holding lug 257 and the differential stop bar 248 may then be pulled rearwardly of the machine by the spring 249 and the ratchet segment 243 moved as already described and until the appropriate differential projection 253 of the bar 248 engages the lowered key stem.

When the ratchet segment is set by the depression of one of the keys 231 for a predetermined automatically controlled repetition of additive movements, means are provided to hold the equalizer key bar 234 and the depressed key in set position until the instigated calculation is completed, all as described in my co-pending application Serial No. 452,876.

Upon depression of any one of the keys 231 a reciprocatory movement is automatically imparted to the shaft 222. At the righthand side and beneath the bank of keys 231 an arm 273 is fixed upon this shaft and has pivotal connection at 274 with a link 275 pivotally connected at 276 in a guard arm 277 extending up from a lower pivotal mounting 278 in the frame of the machine. A spring 279, fixed at the front at 281 in the frame of the machine, is connected to the forward end of the link 275 at 282 and tends to pull the arm 273, which is fixed on the shaft 222, toward the front of the machine. Periodic controlled reciprocation rearwardly of the machine is imparted to the arm 273 and shaft 222 under the control of the keys 231.

Means are provided for insuring complete key strokes of the digital keys 64 of the additive actuating mechanism, as will now be described.

Figure 2:
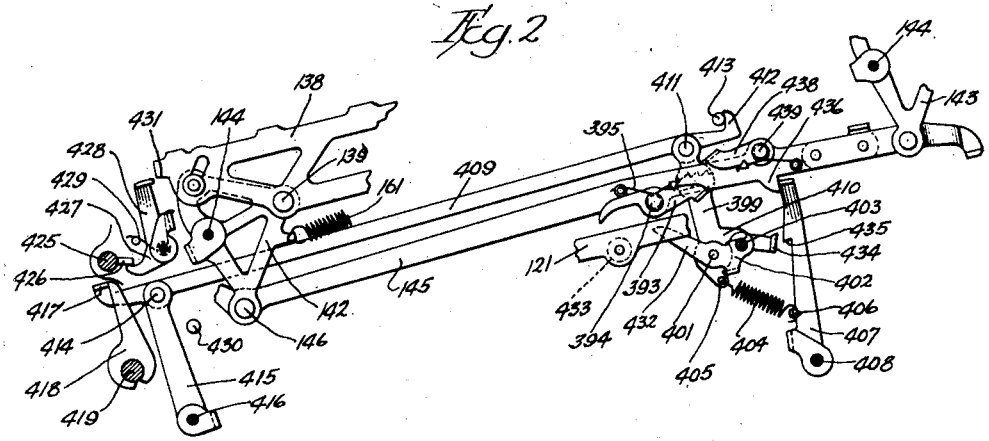
Fig. 2 is an elevation of a portion of the error control mechanism.
Figure 3:
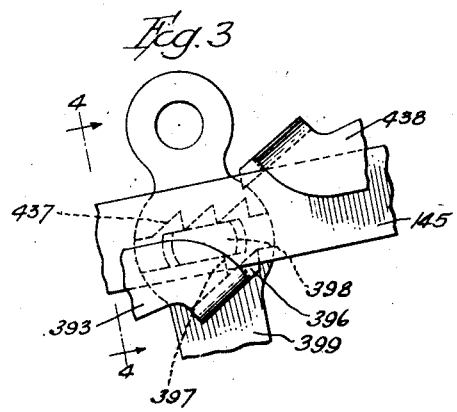
Fig. 3 is an enlarged fragmentary detail of a portion of the error control mechanism.
Figure 4:
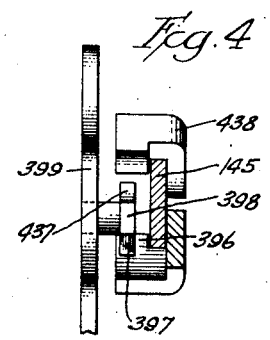
Fig. 4 is a section taken substantially on the line 4—4 of Fig. 3.
Figure 5:
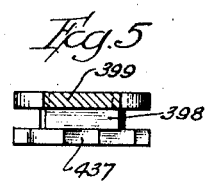
Fig. 5 is a section taken across certain parts of the error control mechanism.

A latch 393 (Fig. 2) is pivoted at 394 on each bar 145 of each parallel motion device of the adding actuating mechanism. A spring 395 normally presses a lip 396 of the latch 393 up into contact with the under surface of its bar 145. A ratchet tooth 397 is provided upon a ratchet member 398 arranged upon the upper end of a lever 399. The lever 399 is pivoted at 401 in a yoke 402 which in turn is pivoted on a cross-rod 403 extending across the several orders of additive actuating mechanism. A spring 404 is attached at 405 to the lever 399 and to a lip 406 upon a lever 407 pivoted upon a cross-rod 408. Upon depression of one of the keys 64, the bar 145 is moved toward the front of the machine, i. e. toward the left (viewing Fig. 2), and the latch 393 being carried by it moves with it and past the ratchet tooth 397.

If a key be released without fully effective depression, the forward movement of the link or bar 145 will be incomplete and the spring 161 of the parallel motion device (of which it forms a part) tends to return the parts to their original position without accomplishing the calculating operation. In order to advise the operator that an incomplete key stroke has been made and to insure redepression of the particular key in necessary amount, locking mechanisms are provided, which will now be described. As a result of an incomplete movement all of the columns of keys are locked against operation as a warning or notice to the operator of an insufficient or incomplete key stroke.

A link 409 is pivoted at 411 to the upper end of the lever 399 and is provided at its rear end with a hook 412 normally engaging a stud 413 fixed in the frame and limiting forward movement of the lever under the influence of the spring 404. The link 409 is pivoted at 414 to the upper end of an arm 415 in turn pivoted at its lower end at 416 in the cross-rod in the frame. This link 409 is provided with a laterally bent or extending lug 417 arranged in the path of an upwardly extending arm 418 attached to a shaft 419 extending past the several orders of the machine. This shaft 419 is provided with an arm 421 (Fig. 6) extending forwardly of the machine and carrying a lip 422 at its free end. This lip is normally arranged behind and holds forwardly the lever end 423 of a companion arm 424 fixed upon a cross-shaft 425. Rocking of the shaft 419, upon insufficient key stroke in any column, lifts the arm 421 and frees the arm 424 so that it may be brought to locking position as will now be described.

The shaft 425 is provided adjacent each column of the machine, including the multiplying column, with a leaf 426 extending out over the tail 427 of a locking dog 428 mounted upon a cross-rod in the machine. Springs 429 normally urge these dogs rearwardly into position to engage beneath shoulders 431 on the forward ends of the equalizer key bars 138, 234. The springs 429 pressing upon the leaves 426 move the arm 424 in a counter-clockwise direction when the arm 421 is lifted by the incomplete key stroke of a particular column and move also the dogs into locking position into all of the columns except the one in which the insufficient key stroke has occurred.

The dog 428 of this column is prevented from engaging beneath its companion shoulder 431 of its equalizer key bar by reason of the circumstance that the latching of the latch 393 has prevented the complete return to normal position of the parallel motion device. This is accomplished through the engagement of the arm 415 with a stop 430 appropriately arranged in the path of the return reciprocation of this arm. It will be noted that since the latch 393 is engaged at this time behind the ratchet tooth 397 the link 409 and the arm 415 must move back with the bar 145. Correction of the error by the complete and proper depression of a key permits the parts to return to normal position, whereupon the dog 428 of the column affected moves to locked position and the complete locking of the keyboard is accomplished.

Means are provided for moving the ratchet tooth 397 out of the path of the latch 393 if and when full key stroke is accomplished. An arm 432 is provided upon the yoke 402 to extend across the path of a roller 433 carried upon the link 121. As the parts near the end of the power stroke, the roller 433 engages the arm 432 of yoke 402 and lifts the yoke about its pivot 403 carrying up the lever 399 to raise the ratchet tooth 397 above the lower edge of the bar 145 and out of the way of the latch 393.

The yoke 402 has a rearwardly extending arm 434 formed into a bent lip at its end which is adapted to engage beneath a shoulder 435 when the lever 399 is lifted by the roller 433. This lever is held in this upper latched position until near the end of the return stroke when a lug 436 on the bar 145 engages the upper end of the lever 407 to disconnect it from the arm 434, arranging the parts for the next calculating operation. A rearwardly extending lug 410 is provided on the lever 399 for engagement with the rod 403 to limit downward movement under the pull of the spring 404 when the parts are moving from one position to another.

To prevent miscalculation from redepression of a key before the adding operation of the previous stroke is completed, a number of ratchet teeth 437 are arranged on the ratchet member 398 and in position to be engaged and locked by a latch 438 arranged at 439 on the bar 145 as this bar and the key depressed return to normal. It has also been pointed out that the key must be fully depressed or the keyboard locks.

After full depression of the key, the lever 399 is lifted and effort to depress the parallel motion device through the key before the adding movement is completed will cause engagement by the latch 438 with one or the other of the teeth 437 since during the return or adding motion of the bar 145 the lever 399 is held in raised position by the lever 407 and is adapted for engagement by the latch 438 if the depression of a key tends or attempts to move the bar 145 in the reverse direction, i. e. upon a new adding actuation.

Referring now to Fig. 7, reference character 451 indicates a key for releasing the column locks set into action by the insufficient depression of a key as just described. The key 451 is provided with a stem 452 which is arranged above a turned-over end 453 of a lever 454 mounted in the column space between the multiplier keys and the additive actuating keys being pivoted upon a shaft 455 extending across the machine. The lever 454 has a downward projection 456 arranged above a leaf 457 fast in the shaft 425. The position of the parts shown in Fig. 7 is that assumed normally and when the keyboard is not locked as a result of insufficient key stroke.

It will be remembered that the shaft 425 is swung in a counter-clockwise direction by the springs of the latch dogs 428 after an insufficient key stroke. This movement raises the key 451 in position to be depressed by the operator after the correction of error and to release the key locks. Downward movement of the key 451 swings down the leaf 457 and rocks the shaft 425 back to its normal position. This movement rocks the arm 424 toward the front of the machine into reengagement with the arm 421. The latches 428 have been forced down and are held in released position by the arm 421.

Means are provided in the machine for permitting the correction of an error in setting up the keys of a multiplicand or a dividend. A button 265 is arranged in front of each bank or column of keys of the adding actuating mechanism. This button is provided with a stem 266 arranged through the housing 267 in the casing. The lower end of the stem bears upon a ledge 268 upon a rocker bell crank 269 pivoted upon a cross-rod 214. A stud 461 is arranged upon the upper arm of each rocker bell crank (there being a rocker bell crank provided for each additive order of the mechanism), which stud is adapted for engagement with an upwardly extending arm 462 formed integral with the latch 207. Depression of the button 265 of a column in which a key has been set causes unlatching of the latch extension 205 of the bar 145 from the lug 206 of the latch 207 and permits the parts to return to normal unset position.

Means are also provided to prevent engagement of the latch 393 with its companion tooth 397 as the parts move back to position after such a release. It will be remembered that these latches are rendered inactive only after a forward adding movement of the link 121. Thus under key-set action if it is desired to clear a key in any column prior to an adding actuation in that column, the latch 393 must be cleared or the return of the link 145 will set the key locks of the whole keyboard. This bar has no forward movement prior to a resetting operation. This means is described in connection with the mechanism which is provided to reset all of the keys after a calculation has been completed.

Referring to Fig. 7, it will be noted that a key 463 is provided between the board of additive actuating mechanism keys 64 and the column of multiplier keys 231. This key has a stem 464 which rests upon a lip 465 of a three-arm lever 467 pivoted at 468 in the frame. The forward arm 469 of this lever is arranged beneath a stud 471 on an arm 472, keyed to shaft 211. Downward depression of the key 463 rocks the lever 467, lifting the stud 471 and rocking the shaft 211 in a counter-clockwise direction. This rocking movement forces the latches 207 down to free all of the units of adding actuating mechanisms. This rocking of the shaft is permitted by the slot 218 and pin 219 connection (Fig. 8), the spring 221 returning the parts to normal operative position after a releasing movement.

The lever 467 has a third arm 473 extending down and forwardly and pivotally connected at 474 with a link 475 extending back and connected by a pin and slot connection 476 with a downwardly extending arm 477 mounted upon a rock shaft 478 which extends across the machine in bearings 479, all as described in my co-pending application Serial No. 452,876.

Means are provided for locking the multiplier keys 231 against depression when the machine is arranged for key-responsive operation. It will be remembered that the shaft 201 is rocked with the walking beam lever 185 to convert the machine from a key-responsive to a key-set control and vice versa. Shaft 201 (Fig. 6) is provided at its righthand end with an arm 200 which is formed into a lug 499 adapted to engage beneath a shoulder lug 501 when the shaft 201 is arranged in or rocked to the position shown, which is the position it assumes when the machine is arranged for key-responsive action of its ordinal actuating mechanisms. When the parts are in this position, the arm 200 prevents depression of the bar 234 and all of the keys 231 are locked against actuation.

While the invention has been hereinabove described and explained as incorporated in an adding or calculating machine wherein progressive adding actuations are received for all forms of calculation and by progressive advancement accumulators, it will be readily understood that from many standpoints the invention can as readily be incorporated in calculating machines of other types and wherein additive actuation is accomplished other than by mere progressive and successive advancement of the accumulators.

It is thought that this invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a calculating machine, the combination of ordinal actuating mechanism, depressible keys regulating the additive degree of actuation of the various orders of actuating mechanism, a control mechanism for regulating the multiplicity of times said ordinal actuating mechanism is to be actuated and comprising other depressible keys, and an error control mechanism for locking both keys of the ordinal actuating mechanism and the multiplicity control mechanism against depression upon incomplete key stroke.

2. In a calculating machine, the combination of ordinal actuating mechanism, depressible keys regulating the additive degree of actuation of the various orders of actuating mechanism, a control mechanism for regulating the multiplicity of times said ordinal actuating mechanism is to be actuated and comprising other depressible keys, and an error control mechanism for locking the keys of said multiplicity control mechanism against subsequent manipulation upon incomplete key stroke.

3. In a calculating machine, the combination of ordinal actuating mechanism, depressible keys regulating the additive degree of actuation of the various orders of actuating mechanism, a control mechanism for regulating the multiplicity of times said ordinal actuating mechanism is to be actuated and comprising other depressible keys, and an error control mechanism for locking the keys of said multiplicity control mechanism against subsequent manipulation upon incomplete key stroke of a depressible key of the ordinal actuating mechanism.

4. In a power-driven ordinal actuating mechanism arrangeable for key responsive calculation and for key set calculation, an automatic multiple control mechanism for determining the number of repeated actuations of said actuating mechanism when arranged for key set calculation, and a locking device for locking said automatic multiple control mechanism against manipulation when said ordinal actuating mechanism is arranged for key responsive calculation.

5. In a calculating machine of the key set multiple control type, the combination of keys for setting up the items to be added, other keys for controlling the number of times the items set shall be added, and an error control mechanism for locking the two sets of keys upon a partial stroke of a key of the first mentioned set.

6. In a calculating machine of the key set multiple control type, the combination of keys for setting up the items to be added, other keys for controlling the number of times the items set shall be added, and an error control mechanism for locking the last mentioned set of keys against subsequent manipulation upon incomplete stroke of a key of the first mentioned set.

7. In a calculating machine, the combination of ordinal actuating mechanism, depressible keys regulating the additive degree of actuation of the various orders of actuating mechanism, a control mechanism for regulating the multiplicity of times said ordinal actuating mechanism is to be actuated and comprising other depressible keys, and inter-ordinal devices for locking both keys of the ordinal actuating mechanism and the multiplicity control mechanism against depression upon incomplete key stroke.

8. In a calculating machine, the combination of ordinal actuating mechanism, depressible keys regulating the additive degree of actuation of the various orders of actuating mechanism, a control mechanism for regulating the multiplicity of times said ordinal actuating mechanism is to be actuated and comprising other depressible keys, inter-ordinal devices for locking both keys of the ordinal actuating mechanism and the multiplicity control mechanism against depression upon incomplete key stroke, and means for releasing said locking devices.

9. In a calculating machine, the combination of ordinal actuating mechanism, depressible keys regulating the additive degree of actuation of the various orders of actuating mechanism, a control mechanism for regulating the multiplicity of times said ordinal actuating mechanism is to be actuated and comprising other depressible keys, and inter-ordinal devices for locking the keys of said multiplicity control mechanism against subsequent manipulation upon incomplete key stroke.

10. In a calculating machine, the combination of ordinal actuating mechanism, depressible keys regulating the additive degree of actuation of the various orders of actuating mechanism, a control mechanism for regulating the multiplicity of times said ordinal actuating mechanism is to be actuated and comprising other depressible keys, and inter-ordinal full-stroke compelling devices for locking both keys of the ordinal actuating mechanism and the multiplicity control mechanism upon mismanipulation to notify the operator of error.

11. In a power-driven ordinal actuating mechanism, optionally arrangeable for key responsive calculation or for key set calculation, an automatic multiple control mechanism for determining the number of repeated actuations of said actuating mechanism when arranged for key set calculation, keys controlling said automatic multiple control mechanism, and means for locking said keys against manipulation when said ordinal actuating mechanism is arranged for key responsive calculation.

12. In a calculating machine, the combination of ordinal actuating mechanism, depressible keys regulating the additive degree of actuation of the various orders of actuating mechanism, a control mechanism for regulating the multiplicity of times said ordinal actuating mechanism is to be actuated and comprising other depressible keys, and inter-ordinal full-stroke compelling devices for locking the keys of said multiplicity control mechanism against subsequent manipulation upon mismanipulation of the first named keys to notify the operator of error.

JOSEPH A. V. TURCK.